United States Patent Office 3,258,458
Patented June 28, 1966

3,258,458
9α-FLUORO-5',11β-DIHYDROXY - 4',5' - DIHYDROSPIRO[ANDROST - 4 - ENE - 17,2'(3'H) - FURAN]-3-ONE, CORRESPONDING 5'-ETHERS, AND PRECURSOR
Edward A. Brown, Wilmette, Ill., assignor to G. D. Searle & Co., Chicago, Ill., a corporation of Delaware
No Drawing. Filed June 5, 1964, Ser. No. 373,098
4 Claims. (Cl. 260—239.55)

This invention relates to 9α-fluoro-5',11β-dihydroxy-4',5'-dihydrospiro[androst-4-ene-17,2'(3'H)-furan]-3-one, corresponding 5'-ethers, and intermediates thereto. More particularly, this invention provides novel, useful, and unobvious chemical compounds of the formula

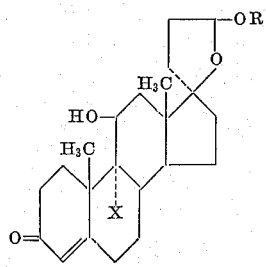

wherein R represents hydrogen or an alkyl radical and X represents halogen.

Among the alkyl radicals represented by R, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings of the formula

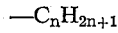

wherein n repersents a positive integer less than 8.

The halogens represented by X include fluorine, chlorine, and bromine, of which fluorine appears to be best adapted to the purposes hereinafter set forth.

The compounds to which this invention relates are characterized by valuable pharmacological properties. For example—and surprisingly—they manifest progestational activity in the well-known Clauberg assay for this effect. They also block the effect to desoxycorticosterone acetate on urinary sodium and potassium.

Preparation of the subject compounds proceeds by reducing a tetrahydrofuran solution of 3-(3-ethoxy-9α-halo-11β,17β-dihydroxyandrosta-3,5-dien-17-yl)-propionic acid lactone in liquid ammonia with metallic sodium to the corresponding lactol, which affords the corresponding 4-en-3-one on acidification with hydrochloric acid in dioxane solution and, alternatively, the 5'-ethereal 4-en-3-ones if an alkanol be present during acid treatment.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced wtihout departing from the purpose and intent of this disclosure. Throughout the examples hereinafter set forth, temperatures are given in degrees centigrade and relative amounts of materials in parts by weight, except as otherwise noted.

EXAMPLE 1

A. *3 - ethoxy - 9α - fluoro - 4',5' - dihydrospiro[androst-4-ene-17,2'(3'H)furane]-5',11β-diol.*—To 300 parts of liquid ammonia is added, with vigorous stirring, a solution of 10 parts of 3-(3-ethoxy-9α-fluoro-11β,17β-dihydroxyandrosta-3,5-dien-17α-yl)propionic acid lactone in 450 parts of tetrahydrofuran followed, during 8 minutes, by 5 parts of sodium metal. Stirring is continued for 12 minutes, at which point 6 parts of ethanol is carefully stirred in during 3 minutes. The bulk of the ammonia is then allowed to evaporate, at which point the reaction mixture is poured into 6000 parts of cold water. The precipitate thrown down is filtered off, washed with water, dried in air, and thereupon recrystallized from ethyl acetate to afford 3-ethoxy-9α-fluoro-4',5'-dihydrospiro[androst-4-ene-17,2'(3H)furane]-5',11β-diol, melting at 166–170°.

B. *9α - fluoro - 5',11β - dihydroxy - 4',5' - dihydrospiro[androst-4-ene-17,2'(3'H)furan]-3-one.*—To a solution of 30 parts of 3-ethoxy-9α-fluoro-4',5'-dihydrospiro[androst-4-ene-17,2'(3'H)furane]-5',11β-diol in 400 parts of dioxane is added 10 parts of water and 5 parts of concentrated hydrochloric acid. The resultant mixture is allowed to stand at room temperatures for 2 hours, whereupon it is diluted with 2000 parts of water. The precipitate thrown down is filtered off, washed with water, dried in air, and thereupon recrystallized from ethyl acetate to give 9α-fluoro-5',11β-dihydroxy-4',5'-dihydrospiro[androst-4-ene-17,2'(3'H)furan]-3-one melting at 221-226°. The product has the formula

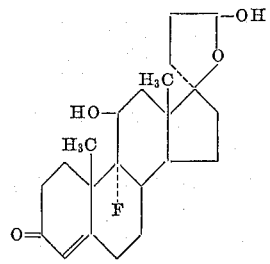

EXAMPLE 2

*9α - fluoro - 11β - hydroxy - 5' - methoxy - 4',5' - dihydrospiro[androst-4-ene-17,2'(3'H)furan] - 3 - one.*—To a suspension of 25 parts of 3-ethoxy-9α-fluoro-4',5'-dihydrospiro[androst-4-ene-17,2'(3'H)furane]-5',11β - diol in 400 parts of methanol is added 100 parts of water and 119 parts of concentrated hydrochloric acid. The resultant mixture is stirred at room temperatures for 45 minutes, during which solution, followed by precipitation, occurs. The mixture is chilled to further precipitation. The precipitate is filtered off and washed on the filter with a small amount of methanol, whereupon it is dried in air. The product thus isolated is 9α-fluoro-11β-hydroxy-5'-methoxy-4',5'-dihydrospiro[androst-4 - ene - 17,2'(3'H)-furan]-3-one melting at 214–219°, the formula of which is

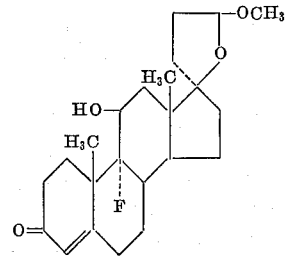

What is claimed is:
1. A compound of the formula

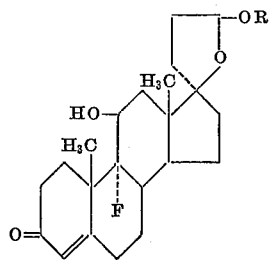

wherein R is selected from the group consisting of hydrogen and lower alkyl radicals.

2. 9α - fluoro - 5',11β - dihydroxy - 4',5' - dihydrospiro[androst-4-ene-17,2'(3'H)furan]-3-one.

3. 9α - fluoro - 11β - hydroxy - 5' - methoxy - 4',5'-dihydrospiro[androst-4-ene-17,2'(3'H)furan]-3-one.

4. 3 -ethoxy - 9α - fluoro - 4',5' - dihydrospiro[androst-4-ene-17,2'(3'H)furane]-5',11β-diol.

No references cited.

LEWIS GOTTS, *Primary Examiner.*